United States Patent
Brouwer

(10) Patent No.: US 11,752,980 B2
(45) Date of Patent: Sep. 12, 2023

(54) IMAGE RECORDING DEVICE, ASSEMBLY, CLEANING DEVICE AND MOTOR VEHICLE

(71) Applicant: MCi (Mirror Controls International) Netherlands B.V., Woerden (NL)

(72) Inventor: Stefan Fritz Brouwer, Schoonhoven (NL)

(73) Assignee: MCi (Mirror Controls International) Netherlands B.V., Woerden (NL)

( * ) Notice: Subject to any disclaimer, the term of this patent is extended or adjusted under 35 U.S.C. 154(b) by 856 days.

(21) Appl. No.: 16/620,151

(22) PCT Filed: Jun. 5, 2018

(86) PCT No.: PCT/NL2018/050363
§ 371 (c)(1),
(2) Date: Dec. 6, 2019

(87) PCT Pub. No.: WO2018/226094
PCT Pub. Date: Dec. 13, 2018

(65) Prior Publication Data
US 2020/0180570 A1 Jun. 11, 2020

(30) Foreign Application Priority Data
Jun. 6, 2017 (NL) .................................... 2019024

(51) Int. Cl.
*B60S 1/56* (2006.01)
*B60R 11/04* (2006.01)
(Continued)

(52) U.S. Cl.
CPC .............. *B60S 1/566* (2013.01); *B60R 11/04* (2013.01); *B60S 1/02* (2013.01); *B60S 1/603* (2013.01);
(Continued)

(58) Field of Classification Search
CPC .. B60S 1/566; B60S 1/02; B60S 1/603; B60S 1/0848
See application file for complete search history.

(56) References Cited

U.S. PATENT DOCUMENTS 3,704,481 A 12/1972 Fennell
2013/0209079 A1* 8/2013 Alexander .............. B60R 11/04
396/25

FOREIGN PATENT DOCUMENTS

CN 102029976 A 4/2011
CN 104797971 A 7/2015
(Continued)

OTHER PUBLICATIONS

Machine translation: JPS6264649A; Yanase, S. (Year: 1987).*

*Primary Examiner* — Natasha N Campbell
(74) *Attorney, Agent, or Firm* — Volpe Koenig

(57) ABSTRACT

The invention relates to an image recording device for a body of a motor vehicle. The device comprises a housing part, an optical element having an outer surface, and a driving part for engaging an engaging part of a movable cleaning device. The movable cleaning device comprises furthermore a cleaning part, preferably formed by a wiper part, for at least partly cleaning the outer surface. The driving part is furthermore for driving the movable cleaning device to have the cleaning part at least partly clean the outer surface of the optical element. The image recording device is adjustable between a first condition in which the image recording device allows at least partly introducing or taking out the engaging part of the movable cleaning device and a second condition in which the image recording device prevents the engaging part of the movable cleaning device being taken out or being introduced.

17 Claims, 7 Drawing Sheets

(51) Int. Cl.
    *G02B 27/00*     (2006.01)
    *B60S 1/02*     (2006.01)
    *B60S 1/60*     (2006.01)
    *B60R 11/00*     (2006.01)
    *F28G 3/00*     (2006.01)

(52) U.S. Cl.
    CPC .... *G02B 27/0006* (2013.01); *B60R 2011/008* (2013.01); *F28G 3/00* (2013.01)

(56) References Cited

FOREIGN PATENT DOCUMENTS

| | | | | |
|---|---|---|---|---|
| CN | 105128826 | A | 12/2015 | |
| CN | 106064166 | A | 11/2016 | |
| CN | 106573581 | A | 4/2017 | |
| DE | 102014220257 | A1 | 4/2016 | |
| EP | 3141441 | A1 | 3/2017 | |
| JP | S6264649 | A * | 3/1987 | |
| WO | 2015003705 | A1 | 1/2015 | |
| WO | WO-2015115129 | A1 * | 8/2015 | .............. B60S 1/566 |

* cited by examiner

IMAGE RECORDING DEVICE, ASSEMBLY, CLEANING DEVICE AND MOTOR VEHICLE

CROSS REFERENCE TO RELATED APPLICATIONS

This application is a 35 USC § National Stage application of International Patent Application No. PCT/NL2018/050363, which was filed Jun. 5, 2018, entitled "IMAGE RECORDING DEVICE, ASSEMBLY, CLEANING DEVICE AND MOTOR VEHICLE" and Netherlands Patent Application No. 2019024, which was filed Jun. 6, 2017, and are incorporated herein by reference as if fully set forth.

The invention relates to an image recording device for a body of a motor vehicle, wherein the image recording device comprises an optical element.

Image recording devices of this type are known and are used, for example, in cars, but also in other motor vehicles. The optical element of the image recording device can be or comprise a camera or a part of a camera. The image recording device may be configured to offer vision to a driver of the motor vehicle vision, preferably vision of an area located next to or behind the vehicle.

For example, the image recording device may be configured to offer a driver vision along a flank of the vehicle, of an area next to the driver and/or next to the vehicle and/or behind the vehicle. The image recording device may for example be configured and/or be intended for replacement and/or for support of an exterior mirror or so-called wing mirror of a car or other motor vehicle.

Alternatively or additionally, the image recording device may be for a different purpose, for example, for eliminating a blind spot of an exterior mirror, so that a driver of a motor vehicle can be offered a relatively good view of an area that would not be (well) visible in a conventional exterior mirror of a vehicle, such as, for example, the area next to the driver. This may for example prevent a driver overlooking a vehicle overtaking him when he wants to change lane and then, for example, fails to look over his shoulder properly.

The image recording device may alternatively or additionally be configured and/or intended for assistance in parking. The image recording device may for example constitute a so-called backing camera, which can record a relatively large part or even the complete blind spot behind the motor vehicle, which can thereupon, preferably without appreciable or noticeable delay, be displayed to the driver of the vehicle. For example in the case where the image recording device constitutes a backing camera, the image recording device may, for example, be merely temporarily activated, for example when the vehicle backs up or when the gearbox of the vehicle is in reverse gear.

It is noted that the image recording device for the motor vehicle may also, additionally or alternatively, be intended for other purposes and/or be configured therefor.

In order to prevent the image recording device being at least temporarily unintendedly unable to record a proper image, as a result of which the driver of the motor vehicle, at least temporarily, could not be offered a proper view of a particular situation near the vehicle, a situation should be prevented where the outer surface of the optical element of the image recording device is unintendedly at least temporarily not free of water drops, snow, dirt and/or the like. In particular in the case where the image recording device is intended and/or configured to offer vision of an area that is not or hardly visible to the driver in any other manner, it is desirable that it can be promoted, or can even be guaranteed, that the outer surface of the optical element is clean or can be rendered clean. This can be of particular importance, for example in the case where the image recording device replaces an exterior mirror and there is no traditional exterior mirror present that could serve as a backup if the image recording device is at least temporarily not usable, for example due to the outer surface of the optical element thereof being at least temporarily not clean enough.

The disclosure therefore envisages providing an alternative image recording device for a motor vehicle and/or an alternative motor vehicle with an image recording device. Envisaged in particular is the provision of an image recording device for a motor vehicle and/or a motor vehicle with an image recording device, whereby a condition can be promoted where an outer surface of an optical element of the image recording device is clean enough to be able to record a relatively good image, preferably for display to a driver of the vehicle. Still more particularly, the present disclosure envisages counteracting any condition where, at least temporarily, it cannot be ensured, or cannot be ensured well enough, that the outer surface is clean enough, can be rendered clean enough and/or can be kept clean enough.

An aspect of the present disclosure provides to that end an image recording device for a body of a motor vehicle, comprising a housing part, an optical element having an outer surface, and a driving part for engaging an engaging part of a movable cleaning device, for example a wiper, which movable cleaning device furthermore comprises a cleaning part, for example a wiper part, for at least partly cleaning, for example at least partly wiping, the outer surface, wherein the driving part is furthermore for driving the movable cleaning device in order to have the cleaning part at least partly clean the outer surface of the optical element, and wherein the image recording device is adjustable between a first condition in which the image recording device allows at least partly introducing or taking out the engaging part of the movable cleaning device and a second condition in which the image recording device prevents the engaging part of the movable cleaning device being taken out or being introduced.

The image recording device can hence be so configured as to be adjustable between a first condition in which the image recording device releases the engaging part of the movable cleaning device and thus allows at least partly introducing or taking out the engaging part of the movable cleaning device and a second condition in which the image recording device blocks the engaging part of the movable cleaning device and thus prevents the engaging part of the movable cleaning device being taken out or being introduced.

With the aid of the cleaning device, for example the wiper, the outer surface can be cleaned and/or kept clean. By configuring the image recording device such that it is adjustable between a first condition in which the image recording device allows at least partly introducing or taking out the engaging part of the movable cleaning device and a second condition in which the image recording device prevents the engaging part of the cleaning device being taken out or being introduced, this can on the one hand prevent the cleaning device being purloined, for example by a vandal or thief, while on the other hand it can also be ensured that a worn and/or damaged cleaning device can be replaced relatively simply. This promotes a condition where at all times a relatively well working cleaning device, for example a relatively well cleaning wiper, can be present, since it is made possible for a cleaning device not functioning properly to be replaced relatively simply and, what is more, in addition, this counteracts a cleaning device disappearing unintendedly, for example when the vehicle is parked. Accordingly, this can for example prevent the cleaning device, for example the wiper, not being present anymore when a driver, for example, is about to leave in a vehicle which has been parked for some time. Also, this can counteract the image recording device unintendedly at least temporarily not functioning well or not well enough.

The image recording device according to this aspect of the present disclosure can hence relatively well prevent a situation where it can temporarily not be ensured, or not be ensured well enough, that the outer surface of the optical element is clean enough, can be rendered clean enough and/or can be kept clean enough, for example to offer a driver of the motor vehicle a relatively good view of a particular part of the surroundings of the motor vehicle. This can for example obviate the driver participating in traffic with a relatively unsafe vehicle.

In a preferred embodiment according to an aspect of the disclosure, the image recording device is so configured that in the second condition of the image recording device, the positioning of the driving part relative to the housing part prevents the engaging part of the cleaning device being taken out or being introduced. Thus, with the aid of a drive for the cleaning device, it can not only be arranged that the cleaning device can be driven to clean the optical element, but also, with the aid of that same drive, the image recording device can be brought in a locking condition in which the cleaning device is locked and whereby, for example, theft of the cleaning device can then be prevented.

By using a same driving part for both the cleaning, in particular wiping, of the optical element and also for the locking of the cleaning device, in particular the wiper, such an aspect of the present disclosure can contribute in a relatively elegant, relatively simple and/or relatively cost-efficient manner to a relatively safe image recording device for a motor vehicle.

The present disclosure furthermore relates to a cleaning device, in particular a wiper, for an image recording device according to an aspect of this disclosure. The cleaning device, which may for example be intended to replace a damaged and/or worn cleaning device, may be configured to cooperate with the image recording device.

Also, the disclosure relates to an assembly comprising an image recording device and a corresponding cleaning device, in particular a wiper.

Further, the disclosure relates to a motor vehicle provided with at least one image recording device and/or at least one assembly including an image recording device and a corresponding cleaning device, in particular a wiper.

Further advantageous embodiments of the disclosure are represented in the subclaims and described in the description below.

The invention will be further elucidated on the basis of an exemplary embodiment represented in the drawing. In the drawing.

The drawing shows only schematic views of a preferred embodiment of the disclosure. In the figures, like or corresponding parts are designated with the same or corresponding reference numerals.

Figure 1:
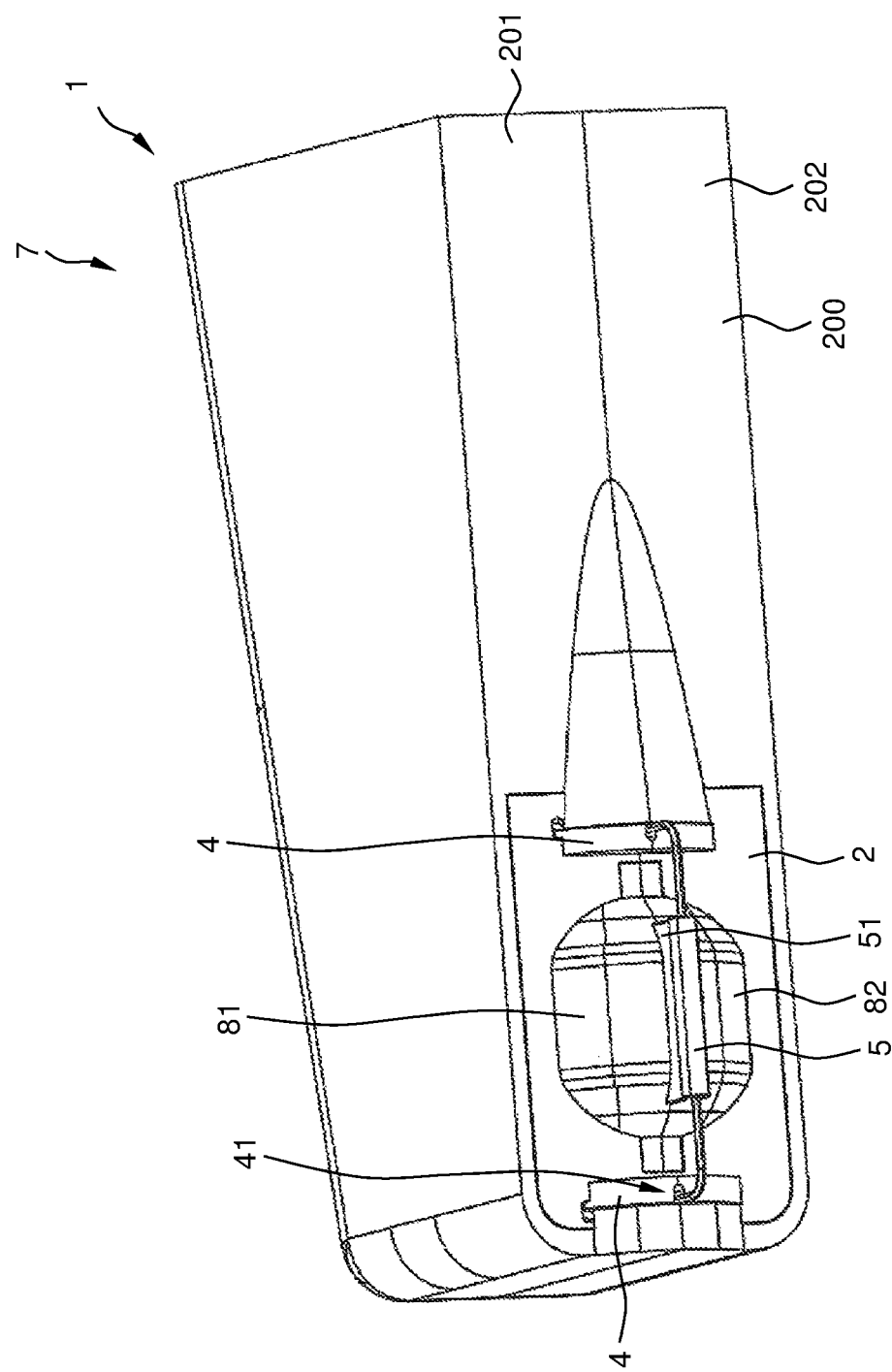
FIG. 1 shows a schematic perspective view of an exemplary embodiment of an image recording device, with this image recording device provided with a cleaning device in the form of a wiper.

FIG. 1 shows a schematic perspective view of an image recording device 1. The device 1 may for example be intended to offer a driver of the vehicle vision of a part of the surroundings of the motor vehicle that would otherwise be poorly visible or not visible to the driver. The device 1 may for example be configured and/or be intended for replacement or for support of an exterior mirror or wing mirror for a motor vehicle, and may for example be for displaying at least a part of a blind spot.

The image recording device 1 comprises a housing part 2. The housing part 2 may for example constitute a part of a housing 200 and/or carrying arm 200 which, for example on the side of the body, may be mounted to the body of the vehicle, for example to a door of the vehicle. It is noted that the housing 200 and/or carrying arm 200 does not need to be rigidly connected to the body, but, for example, may be at least partly collapsible, adapted to be folded (in) and/or slid (in).

Figure 5:
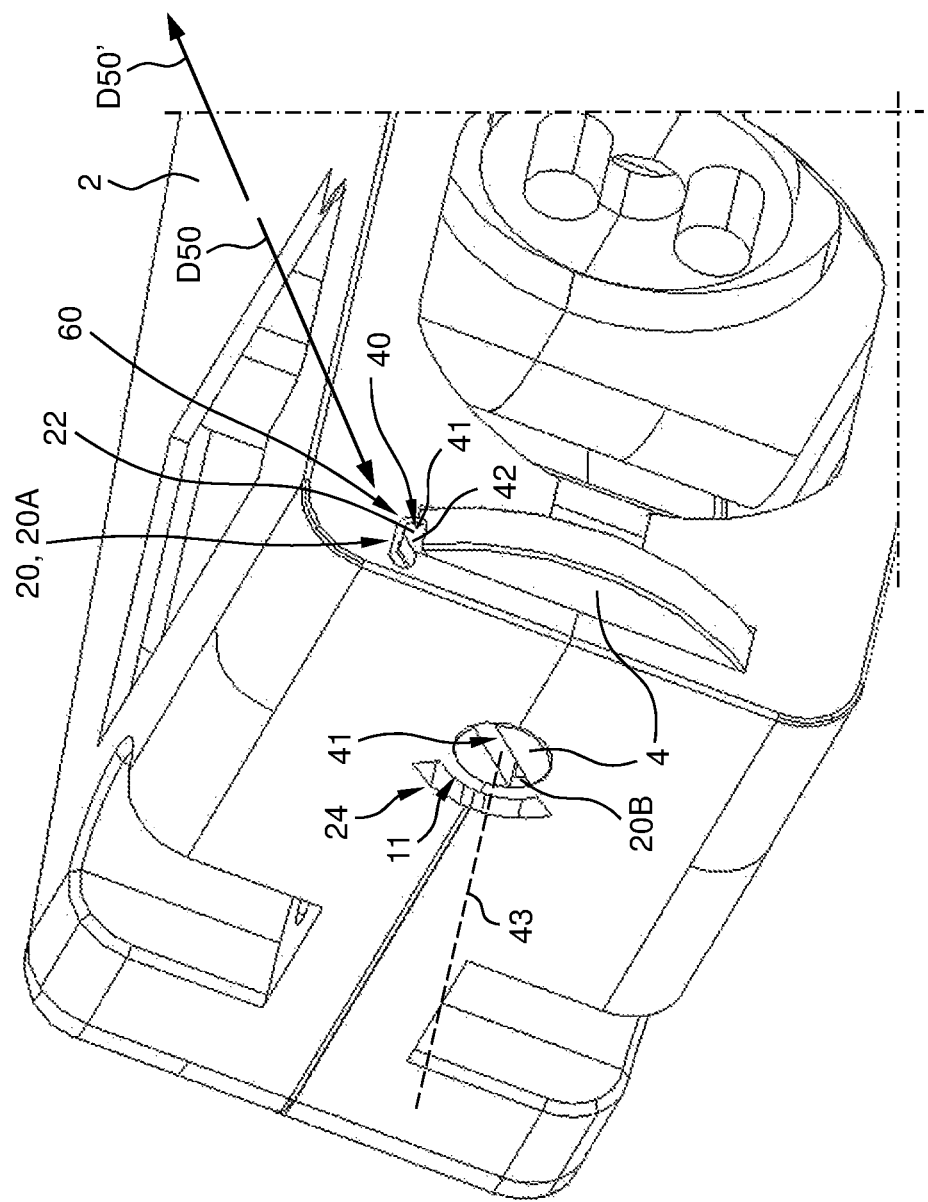
FIG. 5 shows a schematic perspective view of a detail of a housing part and a driving part of the image recording device of FIGS. 1-4.

In the example shown here, the housing part 2 is a loose part, which is also shown, for example, in FIG. 5. Alternatively, however, the housing part 2 may also be integrated in the housing 200 and/or the carrying arm 200.

Figure 2:
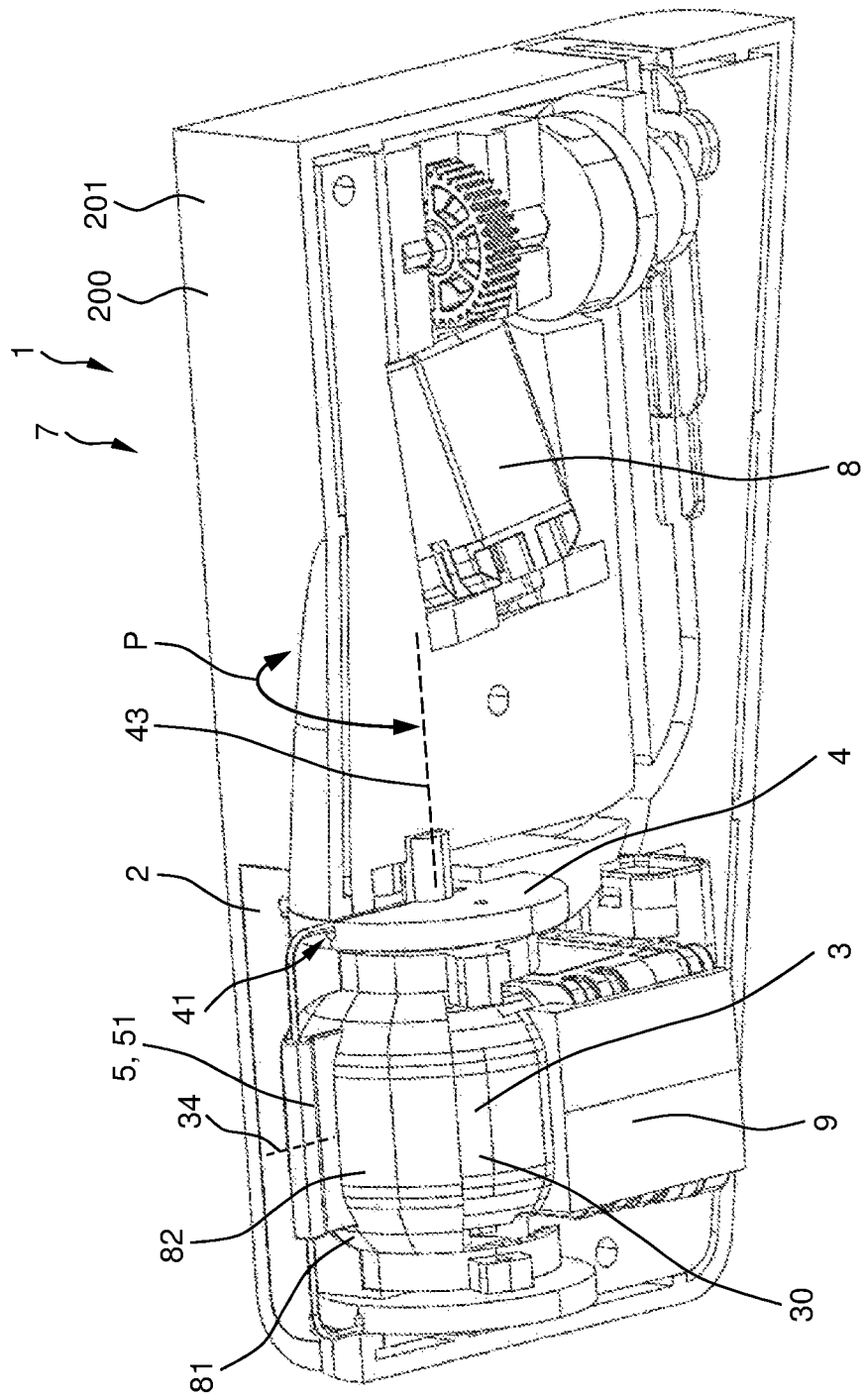
FIG. 2 shows a further schematic perspective view of the image recording device of FIG. 1, with this device being partly cutaway.

In the exemplary embodiment shown here in FIG. 1, the carrying arm 200 comprises two further housing parts 201, 202, which retain the first housing part 2 in the assembled condition of the image recording device 1. In FIG. 2, which shows a first schematic perspective view of the image recording device 1 of FIG. 1, the second housing part 202 is not shown, so that the device 1 is partly cutaway.

The device 1 furthermore comprises an optical element 3. The optical element 3 may be housed in the housing 200, in particular in the first housing part 2 and/or may be supported by the housing 200, in particular by the first housing part 2. The optical element 3 can, for example, be a camera or comprise a camera or can be part of a camera 9. In FIG. 2, in which the image recording device 1 is partly cutaway, the camera 9 is visible.

Images or so-called recordings which are made with the aid of the camera 9 may, for example in the vehicle and/or on a part of the vehicle, be shown to the driver of the vehicle, for example with the aid of one or more electronic visual screens and/or with the aid of projection. It is greatly preferred for such images or recordings to be displayed to the driver of the vehicle without appreciable or noticeable delay.

In FIG. 1 the optical element 3 is not visible. This is because the optical element 3 is temporarily screened off there, in this case by means of two screening caps 81, 82, which may be formed as eyelids, as it were. It is noted that the image recording device 1 in other embodiments can also be free of screening caps, or can have a different number of screening caps, such as, for example, a single screening cap.

By the screening cap or caps 81, 82, the optical element 3 can temporarily, for example when the optical element 3 does not need to be used, for example in a parked condition of the motor vehicle, be at least partly screened, for example to counteract unwanted dirt, precipitation, for example in the form of rain or snow, or anything else, ending up on the optical element 3. The screening cap or caps 81, 82 may, during use, be moved away from their protective position, as can be seen, for example, in FIG. 3, which shows a further schematic perspective view of the exemplary embodiment of the image recording device 1, in which the screening caps 81, 82 have cleared the optical element 3.

The optical element 3 can comprise a sensor, in particular a light sensitive electronic sensor chip, such as a CCD or a CMOS, for scanning or recording images. Additionally, or alternatively, the optical element 3 can comprise at least one lens 32, or a lens system or lens assembly 33 with multiple lenses. Additionally or alternatively, the optical element 3 can comprise at least one at least partly transparent cap 30, in particular an at least partly transparent protection cap 30. The at least partly transparent protection cap 30 can be, for example, a vision-transmissive part of the housing, or can be, for example, a flat plate or transparent window, having an outwardly facing outer surface 31 which, for example, can form a substantially flat plane. Also, however, the protection cap 30 may alternatively have, for example, a curved, preferably convex, outwardly facing outer surface 31, which, for example, may itself also do work as a lens. The at least partly transparent protection cap 30 can constitute a translucent protection or sealing and may, for example, be a part of glass or plastic.

During use, the at least partly transparent protection cap 30 can pass light from outside to a further part, located behind it, of the optical element 3, such as a lens, a lens assembly 33 or a light sensitive electronic sensor chip. The protection cap 30 may, for example, be located in front of a light sensitive electronic sensor chip, and/or may be located in front of one or more lenses 32, which lenses may then be located, for example, between the at least partly transparent protection cap 30 and the chip.

It is noted that in this description the optical element 3 can be a composite optical element 3 which may be composed of multiple parts, of which one or more parts per se could also constitute an optical element.

Furthermore, it is noted that the optical element 3, or a part thereof, in particular any at least partly transparent protection cap 30 for protecting other parts of a composite optical element 3, may be integrated in the housing part 2. In the example shown, the at least partly transparent protection cap 30 is a part of the camera 9.

The optical element 3 has an outer surface 31. The outer surface 31 may, at any rate, for example, at least during use of the image recording device 1, be located on the outside of the image recording device 1 and may, for example during use, be exposed to dirt and/or weather influences, such as precipitation, for example in the form of rain or snow. When the optical element 3 does not need to be used, for example when the vehicle is parked, the outer surface 31 of the optical element may be screened off, for example with the aid of the screening caps 81, 82. In the exemplary embodiment shown, the outer surface 31 of the composite optical element 3 is formed by the at least partly transparent protection cap 30. In alternative embodiments, the outer surface 31 may, for example, be formed by a lens, in particular a front lens.

The part that forms the outer surface 31 of the optical element 3 can comprise a material that is relatively hard and/or relatively scratch-resistant, that is relatively anti-static, that is relatively hydrophobic, and/or that counteracts internal reflection relatively well. Alternatively or additionally, the outer surface 31 may be provided with a coating that is relatively hard, relatively scratch-resistant, relatively anti-static, and/or relatively hydrophobic, and/or counteracts internal reflection relatively well. The image recording device 1 may be provided with a cleaning device 5 having a cleaning part 51 for at least partly cleaning the outer surface 31 of the optical element 3.

Figure 3:
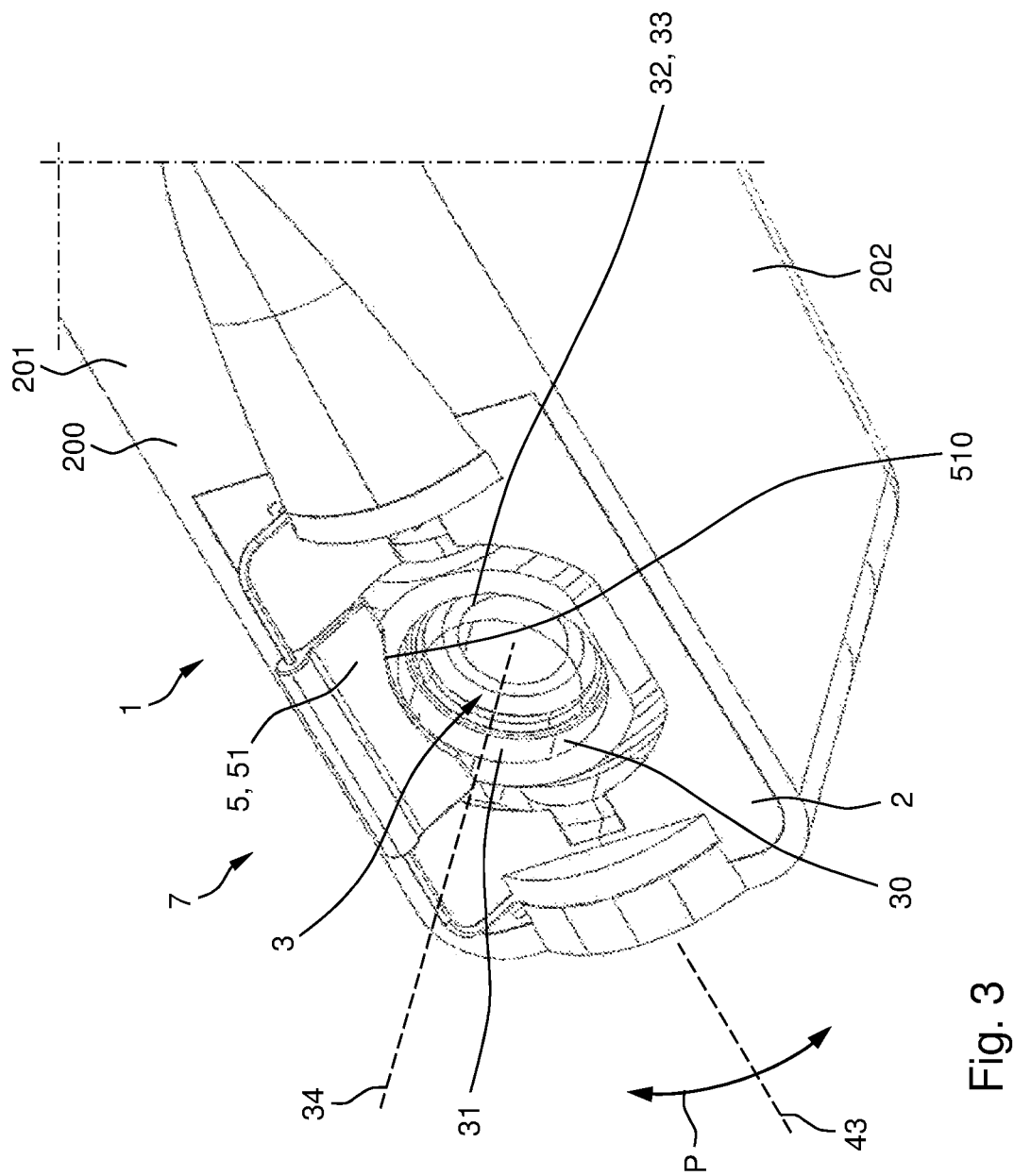
FIG. 3 shows a further schematic perspective view of a detail of the image recording device of FIGS. 1 and 2 in a use condition.

In the present exemplary embodiment, the cleaning device 5 is formed by a wiper 5 having a wiper part 51 for at least partly wiping the outer surface 31. In FIG. 3, which shows an assembly 7 of the image recording device 1 and an exemplary embodiment of the cleaning device 5, here formed by the wiper 5, the cleaning part 51, in particular the cleaning part 51 formed by a wiper part 51, more particularly the wiping edge 510 of the wiper part 51, is placed against the outer surface 31 of the optical element 3. During use of the cleaning device 5, the cleaning device 5, in particular the wiping edge 510, can be moved over the outer surface 31 to clean the outer surface 31.

While the cleaning device 5 in the example shown is formed as a wiper 5, and the cleaning part 51 of the cleaning device 5 in the example shown is formed as a wiper part 51, the cleaning device 5 may in alternative embodiments be formed differently and/or be suitable for cleaning the outer surface 31 of the optical element 3 in a different manner than wiping. The cleaning part 51, while it could comprise, for example, a wiping part, could alternatively or additionally comprise or be, for example, a sprayer, a scraper, a brush and/or a sponge. Also, it is conceivable that cleaning device 5 is alternatively or additionally configured to clean by means of ultrasonic vibrations, and/or by local heating of the outer surface 31 of the optical element 3 and/or contamination such as moisture or dirt present thereon.

It is noted that the cleaning part 51, for example an edge thereof, such as, in the case of a wiper part, the wiping edge 510 thereof, may be so configured that it can conform to the outer surface 31 of the optical element 3 relatively well. If the outer surface 31, for example, is curved in a particular manner, then the edge, in particular the wiping edge 510 if present, may for example be provided with a corresponding concave curvature.

Additionally or alternatively, the cleaning part 51, or at least the edge 510 thereof, may, in embodiments, be provided with a slightly flexible, preferably slightly resiliently compressible, cleaning surface.

For example, the wiper part 51 and/or the wiping edge 510 thereof can comprise a rubber or elastomeric material or be made thereof.

In FIG. 1, which shows a position of the image recording device 1 in which this device 1 is not in use to record images, the screening caps 81, 82 are swung shut so that they temporarily screen off the optical element 3. In embodiments, in such a rest position, the cleaning device 5, such as the wiper 5, can remain in contact with the outer surface 31 of the optical element 3, for example so that the cleaning device 5 does not need to be displaced in order to bring the screening cap or caps in a screening position, and the screening caps 81, 82 can preferably clamp the cleaning part 51, for example implemented as wiper part 51, for example as shown in FIGS. 1 and 2. In a use position, such as shown, for example, in FIG. 3, the screening caps 81, 82 may be moved clear, so that with the aid of the optical element 3 of the image recording device 1 images can be recorded.

Figure 4:
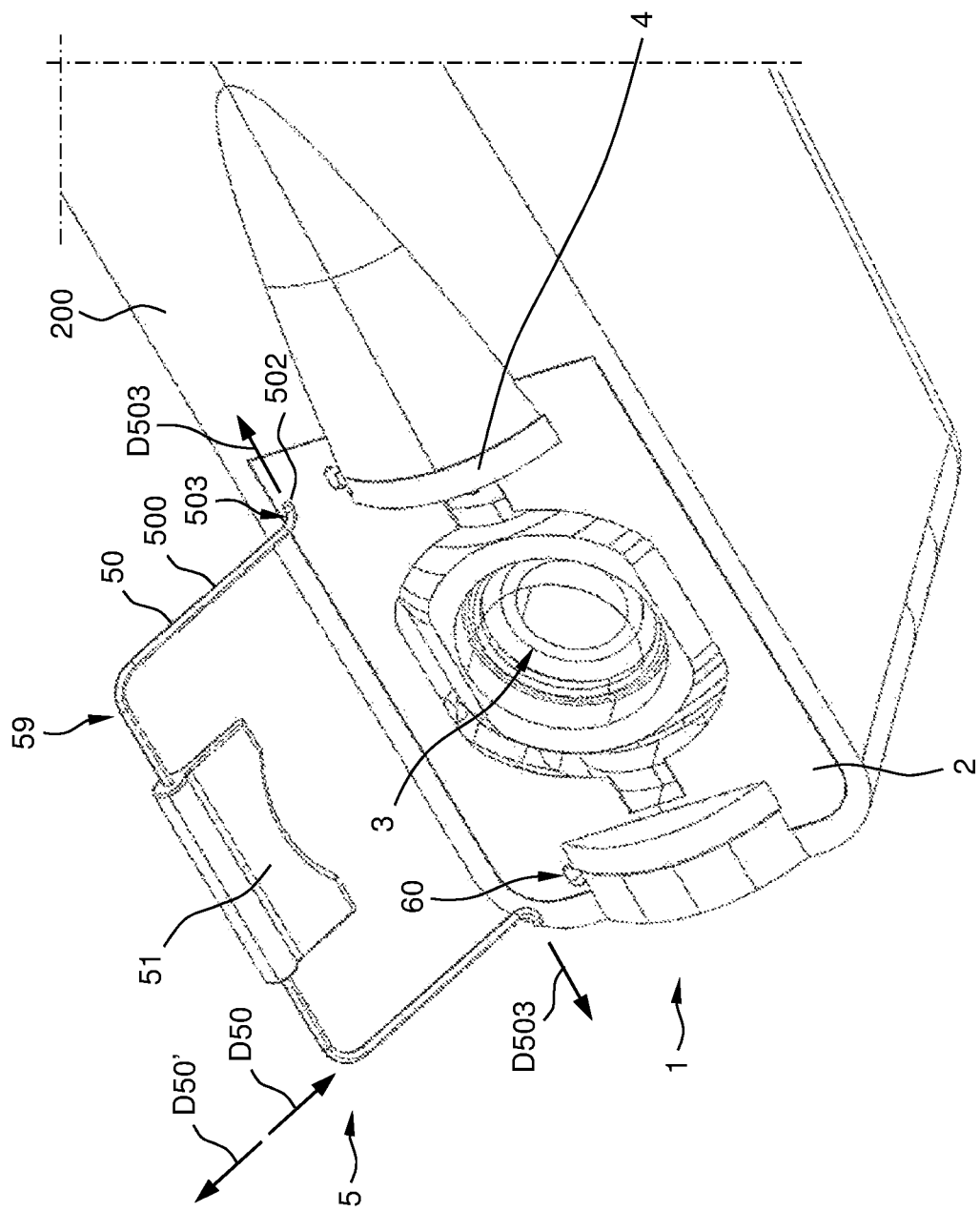
FIG. 4 shows a further schematic perspective view of the detail of the image recording device shown in FIG. 3, with the wiper detached from the image recording device.

The wiper 5, or another cleaning device 5, is detachably mounted in the image recording device 1, and the image recording device 1 can therefore also be, temporarily, free of a cleaning device, for example after a worn and/or damaged cleaning device 5 has been removed and before a replacement cleaning device has been installed. The image recording device 1 of FIG. 3 is also shown in FIG. 4, but unlike in FIG. 3, the wiper 5 in FIG. 4 is detached from the image recording device 1. As a result, the wiper 5 is properly visible in FIG. 4.

As can be properly seen in FIG. 4, the wiper 5 additionally comprises, besides the wiper part 51, an engaging part 50 for cooperation with a driving part 4 of the image recording device 1, which driving part 4 is for driving the wiper 5 in order to have the wiper part 51 at least partly wipe the outer surface 31 of the optical element 3. In the exemplary embodiment shown in FIG. 4, the wiper 5 comprises two engaging parts 50, here formed by legs 500, which, for example at or near their end, may be provided with one or more hook parts 502. It is noted that the wiper 5 can also have a different number of engaging parts, for example a single engaging part or more than two engaging parts.

In the exemplary embodiment shown, the engaging parts 50 of the wiper 5 are formed by portions of a frame 59, in particular a metal frame 59, which supports the wiper part 51 and on which the wiper part is mounted, preferably rigidly mounted. The frame 59 may be manufactured from, for example, wire material. Alternatively, the wiper part 51 and the at least one engaging part can also be integrally formed.

The driving part 4 is configured to cooperate with the engaging part 50 of the wiper 5. During use, the driving part 4 engages the engaging part 50 of the wiper 5, and this engaging part 50 of the wiper 5 in turn engages that driving part 4. The driving part 4 can, for example, at least partly lock or retain the engaging part 50, for example in a receiving channel 41 or feed-through channel 41 located in the driving part 4, so that the driving part 4 carries along the engaging part 50 when the driving part 4 is moved.

Preferably, the wiper part 51 can, during use, move substantially from the top down, for example to have gravity cooperate in discharging water or dirt, but alternatively the wiper part 51 may also move differently, for example, back and forth laterally.

In the exemplary embodiment shown, the driving part 4 is configured to translate, in particular to pivot back and forth about a pivoting axis 43, which reciprocating pivotal movement P is schematically represented in FIGS. 2 and 3 with the aid of arrow P. In preferred embodiments, the pivoting axis 43 may for example be transverse to the optical axis 34 of the optical element 3. Additionally, or alternatively, the pivoting axis 43 may for example extend substantially horizontally, for example in order to be able to wipe away, for example moisture, snow and/or dirt, in a substantially downward direction.

In the exemplary embodiment shown, the driving parts 4, which may, for example, be formed as two discs 44, are driven synchronously during wiping. So, here, during wiping, both driving parts 4 then move simultaneously in the same manner, for example by means of gear synchronization, for example with the aid of a single actuator, in particular a single electric motor 8.

However, in alternative embodiments the driving part 4 can cause the wiper 5 to move in a different manner during use. For example, the wiper part 51 can translate in a substantially flat plane, preferably it can move back and forth in said substantially flat plane, for example in a substantially rectilinear movement. Alternatively, the wiper part 51 can for example rotate such that it always wipes in the same direction over the outer surface 31 of the optical element 3 to be wiped, for example by turning around a rotation axis, which can be preferably substantially parallel to an optical axis 34 of the optical element 3.

While in the exemplary embodiment shown here two driving parts 4 are shown, alternative embodiments can have a different number of driving parts, such as, for example, one, three or four driving parts.

An aspect of the presently disclosed image recording device 1 consists in the image recording device 1 being adjustable between a first condition in which the image recording device 1 allows at least partly introducing or taking out the engaging part 50 of the cleaning device 5 and a second condition in which the image recording device 1 prevents the engaging part 50 of the cleaning device 5 being taken out or introduced. In FIGS. 3-6, the image recording device 1, at least, the parts shown thereof, is in the first condition, while the image recording device 1, at least the parts shown thereof, in FIGS. 1, 2 and 7 is in a second condition. The second condition, which can be called a locking condition, in which the cleaning device 5, in principle, cannot be detached from the image recording device 1, can be a cleaning position, in particular a wiping position. In this cleaning position the cleaning device 5 can be moved, but the device 1 does remain in the second condition in which the engaging part 50 (at any rate, at least one of the possibly multiple engaging parts 50) is locked. This can, for example, also prevent the cleaning device 5, for example formed by the wiper 5, from becoming detached unintendedly during wiping or other cleaning.

Alternatively, the cleaning device 5 may, during cleaning, also move through a position, or possibly even multiple positions, in which the cleaning device 5 is not locked for just a moment. For example to prevent the cleaning device 5 then falling out of the image recording device 1, such a position of the cleaning device 5 in which the cleaning device 5 is not locked may be chosen such that the cleaning device 5 needs to be moved from that position in a direction D50' upwards in order to detach it. Thus, the cleaning device 5 can be prevented from becoming detached unintendedly.

Preferably, however, during cleaning, the cleaning device 5 does not pass any position in which the cleaning device 5 is not substantially locked. In other words, the image recording device preferably does not enter the second condition during the cleaning, for example by wiping, of the outer surface 31 of the optical element 3.

In contrast with the locking in the second condition, the image recording device 1 in its first condition does allow detaching of the wiper 5, or an alternative cleaning device. To this end, the image recording device 1 may for example be provided with a first passage 20 located in the housing part 2 and a second passage 40 located in the driving part 4, whereby in the first condition of the image recording device 1 the first passage 20 and the second passage 40 link up with each other and thus form a composite feed-through passage 60, as can be seen in FIGS. 4 and 5. Through the composite feed-through channel 6, at least a portion of the engaging part 50 of the cleaning device 5 can be displaced such that this portion of the engaging part 50 is thereby simultaneously moved partly through the first passage 20 and partly through the second passage 40. Thus, in the first condition of the image recording device 1 the leg 500 of the engaging part may for example be slid partly through the first passage 20 and partly through the second passage 40, as can be seen, for example, in FIG. 5, whereas the driving part 4 in the second condition, as can be seen, for example, in FIG. 1, prevents the respective engaging part 50 of a wiper being slid inside through the respective first passage 20, since in the second condition of the device 1 adjacent the first passage 20 there is no corresponding second passage in the driving part 4. In the second condition of the image recording device 1, for example, the positioning of the driving part 4 relative to the housing part 2 can hence prevent the engaging part 50 of the cleaning device 5 being taken out or being introduced. In the second condition, the driving part 4 can, as shown in FIG. 1, at least partly close off an open side 22 of the first feed-through channel 21, which is represented by a dotted line 22 in FIG. 5.

To this end, in the second condition of the image recording device 1, the first passage 20 and the second passage 40 can hence be displaced relative to each other with respect to the first condition of the image recording device 1, such that the first passage 20 and the second passage 40 no longer form the composite feed-through channel 60 that was still ample enough to displace at least a portion of the engaging part 50 of the cleaning device 5 partly through the first passage 20 and partly through the second passage 40 in the first condition.

In order to bring the image recording device 1 from the second condition into the first condition, in which the cleaning device 5 can be installed in the image recording device 1, the mutually corresponding first passage 20 and second passage 40 can be brought in line with each other The image recording device 1 may for example be configured to adjust the driving part 4, for example with the aid of the electric motor 8 and a drive train cooperating therewith, and bring it in the first condition. Alternatively or additionally, the image recording device 1 may be configured to allow the driving part 4 to be manually moved to a position corresponding to the first condition. For example to counteract a malevolent person bringing the driving part 4 in such a position in which the cleaning device 5 can be detached, a lock or locking mechanism may be provided that has to be released first before the driving part 4, for example manually, can be adjusted such that the second passage 40 located therein can be brought in the position where this second passage 40 cooperates with the first passage 20 in the housing part 2.

It is noted that the image recording device 1, or a motor vehicle that is provided therewith, is preferably so configured that the image recording device 1 in a parked position of the vehicle is in the second condition. This is to say that when the vehicle, for example a car, is parked, the cleaning device 5, for example formed by the wiper, cannot be taken out of the image recording device 1 without first moving and/or displacing the driving part 4 relative to the housing part 2.

The second feed-through channel 41, which may be formed, for example, as a trench 41, can have an open side 42 which in the first condition of the image recording device 1 links up with an open side 22 of the first feed-through channel 21. It is noted here that the open side 22 or open edge 22 of the first feed-through channel 21 can be understood to mean that edge 22 or side 22 that in the second condition can abut against the driving part 4. This open side 22 of the first feed-through channel 21 and the open side 42 of the second feed-through channel 41 hence face each other in the first condition.

In the first condition, both passages 20, 40 together can hence form the composite feed-through channel 60 which extends in a feed-in direction D50 or a take-out direction D50' of the engaging part 50, as can be seen, for example, in FIG. 5. In the first condition of the image recording device 1, the first passage 20 can substantially extend in the feed-in or take-out direction D50, D50'.

In embodiments, in the first condition of the image recording device 1, the second passage 40 can substantially extend in a feed-in direction D50 or a take-out direction D50' of the engaging part 50 and the first feed-through channel 21 is in line with this feed-in direction D50 or take-out direction D50'. It is noted that while the feed-in direction D50, which corresponds to, but is opposite to, the take-out direction D50', can extend substantially in a straight line, as is the case here, the feed-in and take-out direction D50, D50' can also, in alternative embodiments, be curved, in particular, can follow a part of a circular arc. The leg, or each of the legs, 500 of the engaging part 50 may be so curved as to substantially correspond to the direction in which the respective composite feed-through channel 60 extends in the first condition.

The second feed-through channel 41 which may be defined by the second passage 40 located in the driving part 4 can be open on at least one side 42 which extends substantially parallel to the feed-in direction D50 or take-out direction D50', which open side 42 is represented in FIG. 5 by a dotted line 42. The second feed-through channel 41 can hence, for example, be formed at least partly as a trench 41.

Figure 6:
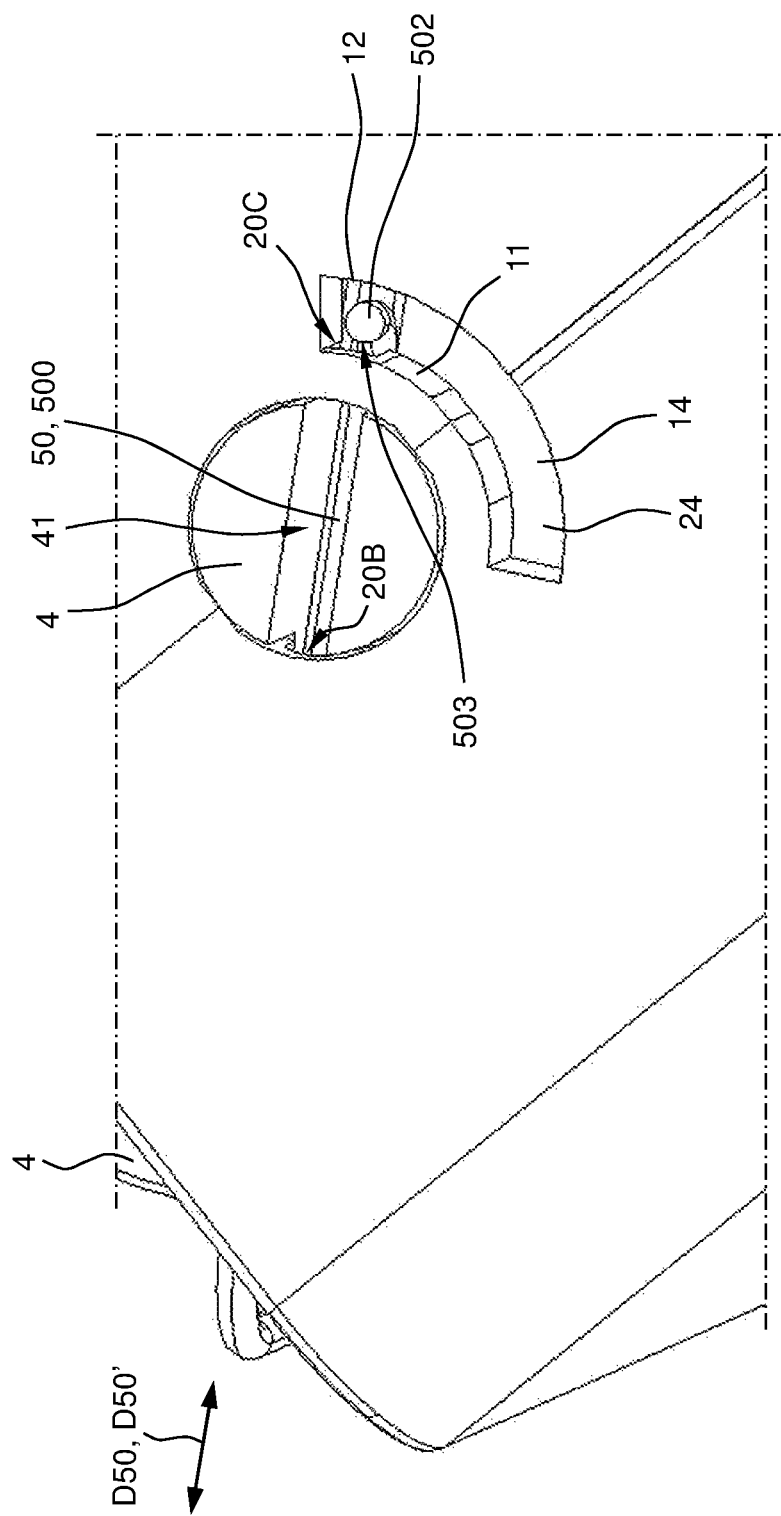
FIG. 6 shows a further schematic perspective view of the housing part and driving part shown in FIG. 5, with a cleaning device in the form of a wiper installed.
Figure 7:
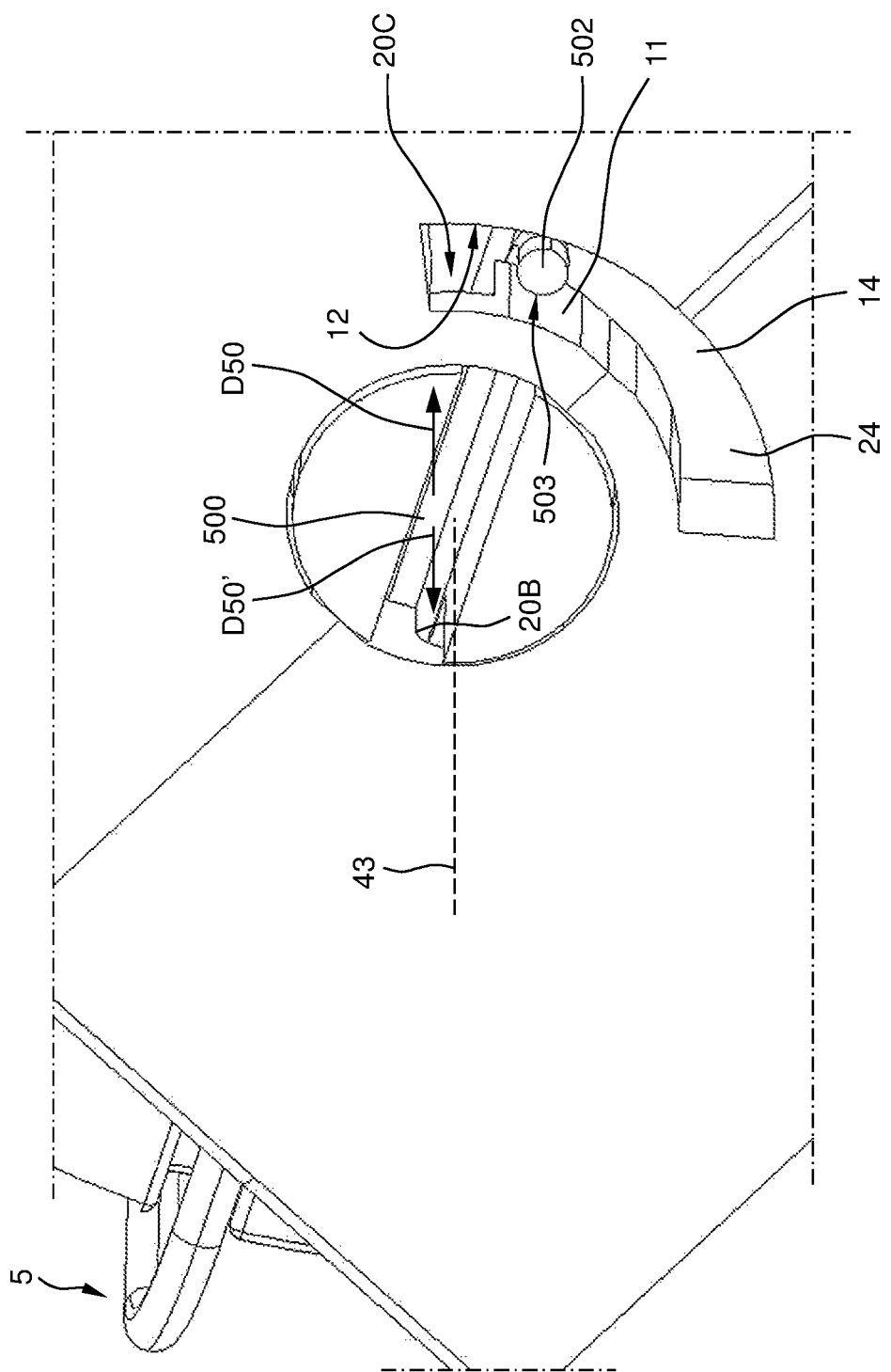
FIG. 7 shows a yet further schematic perspective view of the housing part of FIGS. 5 and 6, with the driving part and the wiper in a different position than in FIG. 6.

FIGS. 5 and 6 show schematic perspective views of the housing part 2 and the driving part 4 in the first condition of the image recording device 1. From FIG. 5 it can be derived that the first passage 20 which is located in the housing part 2 in the example shown comprises three openings 20A, 20B, 20C in three wall parts of the housing part 2. In the first condition of the image recording device 1 these openings 20A, 20B, 20C are in line with the second passage 40 formed by the second feed-through channel 41. In order to install the wiper 5, the engaging part 50 including the associated hook part 502 can be inserted in the first openings 20A and the second feed-through channel 41 cooperating therewith in the first condition. Thereupon, the engaging part 50 can be slid further inside, whereby it can be moved on further through the second feed-through channel 41 and the hook part 502 can be slid for example through the first passage 20, in particular, for example, through further openings 20B, 20C in wall parts of the housing part 2.

As mentioned hereinabove, the cleaning device 5 cannot be detached in the second condition of the image recording device 1, at least, not without causing considerable damage. On the other hand, of course, the intention is not for the cleaning device 5 to prevent the driving part 4 from being displaced in order to bring the device 1 in the first condition. To this end, the engaging part 50 may be configured such that when it has been introduced, the leg 500 thereof is not in the first passage 20 but preferably merely in the second passage 40. Preferably, merely the hook part 502 is still in the first passage 20 and/or in line with the first passage 20, when the engaging part 50 has been introduced far enough. When the driving part 4 is then moved, the leg can hence move along, since the leg 500 is not in the first passage 20, but in the second passage 40 located in the driving part 4 itself. Through movement or displacement of the driving part 4 relative to the housing part 2, the hook part 53 can thereby be brought out of the line of the first passage 20 and/or out of the produced part of the first passage 20, as has been done in FIG. 7. In order to make this possible, the housing part 2 should offer room to the hook part 53 of the engaging part 50 of which the leg 500 moves along and/or displaces along with the moving and/or displacing driving part 4. In the example shown, the housing part 2 is provided to that end with a channel 24 which can house the hook part 53 in the second condition of the image recording device 1. In the example shown, the driving part 4 during cleaning, for example by wiping, rotates about the earlier-mentioned pivoting axis 43. Hence, the channel 24 here extends along a part of a circular arc around the pivoting axis 43. However, such a channel 24 may extend differently in other embodiments. Thus, the channel 24 can extend, for example, in a straight line in the case where the driving part 4 during cleaning moves in a straight line relative to the housing part 2.

Preferably, the image recording device 1, more preferably its housing part 2, may be provided with a first stop surface 11 for, in the second condition of the image recording device 1, cooperating with a stop surface 503 of a hook part 502 of the engaging part 50. The first stop surface 11 can, in cooperation with the stop surface 503 of the hook part 502, for example prevent the engaging part 50 from moving out unintendedly. As a result, not only can a malevolent person be prevented from pulling the cleaning device 5 out of the image recording device 1, for example to make mischief or to steal it, but what can also be prevented is that the contact between the cleaning part 51 and the outer surface 31 of the optical element 3 to be wiped or cleaned otherwise is temporarily or permanently broken or gets too weak to bring about a proper cleaning any longer. The engagement of the stop surface 503 of the hook part 502 with the first stop surface 11 can thus provide for a desired pre-tension or bias by which the cleaning part 51 is pressed against the outer surface 31 to be cleaned. For example to limit friction, a contact between the stop surface 503 of the hook part 502 and the first stop surface 11 can preferably form substantially a line contact or a point contact. For example, at least the stop surface 503 of the hook part 502 may be formed by a spherical surface.

Whilst the engaging part 50 can comprise a substantially elongated part 500, such as a leg 500, which in the first condition can extend substantially in the feed-in direction D50 or take-out direction D50' of the engaging part 50 of the cleaning device 5, by contrast, the hook part 502, at least a stop surface 503 formed by the hook part 502, can extend in a direction D503 which (also) in the first condition deviates from the feed-in and/or take-out direction D50, D50' of the engaging part 50. Preferably, the direction D503 in which the stop surface 503 of the hook part 502 extends can be substantially transverse to the length direction of the leg 500 of the engaging part, and/or the direction D503 of the stop surface in the first condition can be substantially transverse to the feed-in direction D50 or take-out direction D50'.

Behind the first stop surface 11 a free space 14 may be provided for having the hook part 502 move during movement of the cleaning device 5. The free space 14 may for example be formed by a channel 24 which can house the hook part 502 in the second condition of the image recording device 1.

Additionally, or alternatively, the image recording device 1, in particular the housing part 2 thereof, can comprise a further stop surface 12 which is intended to obviate the engaging part 50 being inserted into the image recording device 1 too far. This may for example prevent the cleaning part 51 being pressed against the outer surface 31 of the optical element 3 too hard. Damages to the cleaning part 51 and/or the outer surface 31 can thus for example be counteracted. The further stop surface 12 may for example be formed by a second wall of the channel 24 which can house the hook part 502 in the second condition of the image recording device 1.

It is noted that, for the purpose of clarity and a concise description, elements or features are herein described as part of the same or different exemplary embodiments and that the scope of the invention can encompass embodiments that constitute combinations of any or all of the elements or features described.

It will be clear that each of the image recording devices shown and described and each element of the cleaning devices and assemblies shown and described is also understood to have been described and shown separately and can also be used individually and/or can be used in combination with at least one other element and is understood to have been described herein as such.

Furthermore, it is noted that the invention is not limited to the exemplary embodiments described here. Many variants are possible.

For example, it is noted that wherever a wiper is described or shown, as an alternative thereto an alternative cleaning device may be used. Such an alternative cleaning device can be, for example, a scrubbing device, a scraping device, a spraying device or any other cleaning device. The alternative cleaning device can comprise a cleaning part which is, for example, provided with a sprayer, a scraper, a sponge, a brush, a heating element, and/or an element for at least partly cleaning the outer surface of the optical element by means of ultrasonic vibrations. Also, such alternative cleaning part or other alternative cleaning part can be used as an alternative when in the present disclosure mention is made of a wiper part.

As a further variant, it is furthermore noted that while the driver of the motor vehicle can be a human, in particular a human who is present in the motor vehicle, the vehicle could also be drivable, for example, with the aid of artificial intelligence, and the motor vehicle could be, for example, a self-driving car. The skilled person will understand that the artificial intelligence should also have, for example, sufficient view of the surroundings of the motor vehicle.

These and other variants will be clear to those skilled in the art and are understood to be within the purview of the invention as set forth in the following claims.

The invention claimed is:

1. An image recording device for a body of a motor vehicle, comprising:
    a housing part;
    an optical element having an outer surface
    a movable cleaning device having an engaging part and a cleaning part for at least partly cleaning said outer surface of the optical element; and
    a driving part configured to cooperate with the engaging part,
    wherein during use the image recording device is arranged to drive said driving part so as to drive the movable cleaning device such that the cleaning part of said movable cleaning device at least partly cleans said outer surface of the optical element,
    wherein the image recording device is adjustable between a first condition in which the image recording device allows at least partly introducing or taking out the engaging part of the movable cleaning device, and a second condition in which the image recording device prevents the engaging part of the movable cleaning device from being taken out or being introduced,
    wherein the image recording device further comprises a first passage located in the housing part and a second passage located in the driving part, and
    wherein in the first condition of the image recording device the first passage and the second passage link up with each other and form a composite feed-through channel through which at least a portion of the engaging part of the movable cleaning device can be displaced such that said portion of the engaging part is thereby partly displaced through the first passage and partly through the second passage.

2. The image recording device according to claim 1, wherein, in the second condition of the image recording device, the positioning of the driving part relative to the housing part prevents the engaging part of the movable cleaning device being taken out or being introduced.

3. The image recording device according to claim 1, wherein, in the second condition of the image recording device, the first passage and the second passage are displaced relative to each other with respect to the first condition of the image recording device, such that the first passage and the second passage no longer form a composite feed-through channel through which at least the portion of the engaging part of the movable cleaning device can be displaced such that said portion of the engaging part is displaced partly through the first passage and partly through the second passage.

4. The image recording device according to claim 1, wherein, in the first condition of the image recording device, the first passage extends substantially in a feed-in direction or take-out direction of the engaging part of the movable cleaning device.

5. The image recording device according to claim 4, wherein the first passage defines a first feed-through channel which is open at least on a side which extends substantially parallel to the feed-in direction or take-out direction.

6. The image recording device according to claim 5,
wherein, in the first condition of the image recording device, the second passage extends substantially in a feed-in direction or a take-out direction of the engaging part of the movable cleaning device,
wherein the second passage defines a second feed-through channel which is open at least on a side which extends substantially parallel to the feed-in direction or take-out direction, and
wherein an open side of the first feed-through channel and an open side of the second feed-through channel face each other in the first condition of the image recording device.

7. The image recording device according to claim 1, wherein, in the first condition of the image recording device, the second passage extends substantially in a feed-in direction or a take-out direction of the engaging part of the movable cleaning device.

8. The image recording device according to claim 7, wherein the second passage defines a second feed-through channel which is open at least on a side which extends substantially parallel to the feed-in direction or take-out direction.

9. An image recording device for a body of a motor vehicle, comprising:
a housing part;
an optical element having an outer surface, and
a movable cleaning device having an engaging part and a cleaning part for at least partly cleaning said outer surface of the optical element; and
a driving part configured to cooperate with the engaging part,
wherein during use the image recording device is arranged to drive said driving part so as to drive the movable cleaning device such that the cleaning part of said movable cleaning device at least partly cleans said outer surface of the optical element,
wherein the image recording device is adjustable between a first condition in which the image recording device allows at least partly introducing or taking out the engaging part of the movable cleaning device, and a second condition in which the image recording device prevents the engaging part of the movable cleaning device from being taken out or being introduced,
wherein the image recording device is provided with a first stop surface for cooperating with a stop surface of a hook part of the engaging part of the movable cleaning device in the second condition of the image recording device, and
wherein said engaging part is substantially an elongated part and the stop surface of the hook part extends in a direction deviating from a feed-in direction or take-out direction of the engaging part of the movable cleaning device.

10. The image recording device according to claim 9, wherein the housing part of the image recording device is provided with the first stop surface.

11. The image recording device according to claim 9, wherein said direction in which the stop surface of the hook part extends is substantially transverse to said feed-in direction or take-out direction.

12. An assembly, comprising an image recording device for a body of a motor vehicle, the image recording device comprising:
a housing part;
an optical element having an outer surface;
a movable cleaning device having an engaging part and a cleaning part for at least partly cleaning said outer surface; and
a driving part configured to cooperate with the engaging part,
wherein during use the image recording device is arranged to drive said driving part so as to drive the movable cleaning device such that the cleaning part of said movable cleaning device at least partly cleans said outer surface of the optical element,
wherein the image recording device is adjustable between a first condition in which the image recording device allows at least partly introducing or taking out the engaging part of the movable cleaning device, and a second condition in which the image recording device prevents the engaging part of the movable cleaning device from being taken out or being introduced,
wherein the engaging part of the movable cleaning device comprises a substantially elongated leg and a hook part having a stop surface which extends in a direction deviating from the length direction of the leg of the engaging part.

13. The assembly according to claim 12, wherein said direction in which the stop surface of the hook part extends is substantially transverse to said length direction of the leg.

14. A cleaning device for an image recording device for a body of a motor vehicle, wherein
the image recording device comprises:
a housing part;
an optical element having an outer surface; and
a driving part; and
the cleaning device comprises an engaging part and a cleaning part for at least partly cleaning said outer surface,
wherein the engaging part of the cleaning device engages with the driving part of the image recording device,
wherein during use the image recording device is arranged to drive said driving part so as to drive and move the cleaning device such that the cleaning part of said cleaning device at least partly cleans said outer surface of the optical element, wherein the image recording device is adjustable between a first condition in which the image recording device allows at least partly introducing or taking out the engaging part of the cleaning device, and a second condition in which the image recording device prevents the engaging part of the cleaning device from being taken out or being introduced, wherein the engaging part of the cleaning device comprises a substantially elongated leg and a hook part having a stop surface which extends in a direction that deviates from the length of the leg.

15. The cleaning device according to claim 14, wherein said direction in which the stop surface of the hook part extends is substantially transverse to said length direction of the leg.

16. A motor vehicle provided with an image recording device according to claim 1.

17. The motor vehicle according to claim 16, wherein the motor vehicle is configured such that the image recording device is in the second condition in a parked position of the vehicle.

\* \* \* \* \*